United States Patent
Lüssi et al.

[19]

[11] Patent Number: 5,884,552
[45] Date of Patent: Mar. 23, 1999

[54] EMULSIFIER FOR PREPARING FROTHED MILK AND HOT MILK

[75] Inventors: Andre Lüssi, Wabern, Switzerland; Christoffel Antonius Johannes Vroonland, Soesterberg, Netherlands

[73] Assignee: Sara Lee/DE N.V., Utrecht, Netherlands

[21] Appl. No.: 837,765

[22] Filed: Apr. 22, 1997

[30] Foreign Application Priority Data

Apr. 24, 1996 [NL] Netherlands ............................ 1002935

[51] Int. Cl.⁶ ..................................................... A47J 31/46
[52] U.S. Cl. ............................ 99/323.1; 99/287; 99/293; 99/452; 261/DIG. 7
[58] Field of Search .................................. 99/323.1, 287, 99/293, 452, 454; 261/DIG. 7, DIG. 16, DIG. 76

[56] References Cited

U.S. PATENT DOCUMENTS 4,757,753  7/1988  Pandolfi ................................ 99/293 X
4,922,810  5/1990  Siccardi ................................ 99/293 X
5,265,520  11/1993  Giuliano .............................. 99/293 X
5,473,972  12/1995  Rizzuto et al. ....................... 99/293 X

FOREIGN PATENT DOCUMENTS 0243326  10/1987  European Pat. Off. .

*Primary Examiner*—Reginald L. Alexander
*Attorney, Agent, or Firm*—Welsh & Katz, Ltd.

[57]  ABSTRACT

An emulsifier suitable for emulsifying steam, air and milk for preparing frothed milk for cappuccino and similar beverages. The emulsifier comprises a first steam inlet, an air inlet, a first milk inlet, a first suction chamber and a mixing chamber. The first steam inlet, the air inlet and the first milk inlet open into the first suction chamber. The first suction chamber is in fluid communication with the mixing chamber. The emulsifier further comprises a second steam inlet, a second milk inlet and a second suction chamber. The second steam inlet and the second milk inlet open into the second suction chamber. The second suction chamber is in fluid communication with the mixing chamber for preparing hot, non-frothed milk under supply of steam to the second steam inlet.

18 Claims, 15 Drawing Sheets

EMULSIFIER FOR PREPARING FROTHED MILK AND HOT MILK

This invention relates to an emulsifier for emulsifying steam, air and milk for preparing frothed milk for cappuccino and similar beverages, comprising a first steam inlet, an air inlet, a first milk inlet, a first suction chamber and a mixing chamber, while the first steam inlet, the air inlet and the first milk inlet open into the first suction chamber, and the first suction chamber is in fluid communication with the mixing chamber. The invention also relates to a coffee-making apparatus for preparing cappuccino and similar beverages, comprising a coffee unit for preparing a coffee extract and an emulsifier of the type mentioned in the preamble.

BACKGROUND OF THE INVENTION

Such an emulsifier and coffee-making apparatus are known from European patent application 0,243,326.

This known emulsifier is often used in coffee-making apparatuses for professional use, that is, in the catering industry. In this apparatus, for the purpose of preparing cappuccino, first an amount of coffee extract, that is, black coffee, is introduced into, for instance, a cup. Then, using the emulsifier, an amount of frothed milk is supplied to the cup.

For preparing the frothed milk, an amount of steam is supplied under pressure to the first steam inlet. This steam will move to the first suction chamber. As a result of the venturi effect, a reduced pressure will be created in the first suction chamber, as a result of which air is sucked to the first suction chamber via the air inlet and milk is sucked to the first suction chamber via the first milk inlet. The united air, milk and steam then move from the first suction chamber to the mixing chamber to be properly mixed there, so that frothed milk of a good quality is obtained. Via an outlet of the mixing chamber, frothed milk can thereupon leave the emulsifier to be supplied, for instance, to the cup.

It is desired to be able to prepare not only frothed milk, but also hot, non-frothed milk, for instance for the purpose of obtaining 'café au lait'. To that end, the emulsifier according to European patent application 0,243,326 comprises a controllable valve with which the air inlet can be shut off, the idea being that when no air is supplied to the suction chamber and so only milk and steam are supplied to the suction chamber, the emulsifier will not dispense hot milk that frothes. A problem presents itself, however, in that such an apparatus is rather costly. Moreover, it appears that directly after the air inlet is shut off, yet milk that frothes slightly is dispensed. Also, a temperature problem arises in that the tube passage is unchanged. A further disadvantage is that the emulsifier must be operated by hand and is not adapted for automatic, remote operation for the selection between hot milk or hot frothed milk.

SUMMARY OF THE INVENTION

The object of the invention is to meet this problem and to that effect the invention is characterized in that the emulsifier further comprises at least a second steam inlet, at least a second milk inlet and at least a second suction chamber, while the second steam inlet and the second milk inlet open into the second suction chamber for preparing hot, non-frothed milk under supply of steam to the second steam inlet.

The invention is based inter alia on the insight that it is not possible to provide on an economically attractive basis a control mechanism with which the air inlet can be shut off sufficiently hermetically. As a consequence, with such a control mechanism, also when the air inlet is shut off, an amount of air, albeit small, is yet supplied to the suction chamber. As a result, froth will yet be generated in the hot milk. A cause of the above-mentioned problem with the known apparatus is that between the suction chamber and the control valve a space is present which comprises air which after the shut-off of the air inlet will unavoidably be supplied to the suction chamber and gives rise to the formation of frothed milk. Preferably, the second suction chamber is in fluid communication with the mixing chamber.

Owing to the fact that in accordance with the invention there are provided a first and a second mutually separate supply of steam for the respective preparation of hot frothed milk and hot non-frothed milk, a complete solution to the above-mentioned problem has been found, since, when via the second steam inlet steam is supplied to the emulsifier, this steam will flow to the second suction chamber. In the second suction chamber, a reduced pressure will be created which has as a result that via the second milk inlet milk is supplied to the second suction chamber. However, there is no question of air being supplied to the second suction chamber. The steam and the milk then flow from the second suction chamber to the mixing chamber for obtaining hot milk. The hot milk can then leave the mixing chamber via an outlet of the mixing chamber. It is noted that an excess pressure is created in the mixing chamber as a result of the steam and the milk. This means that it is not possible for air to flow from the first suction chamber to the mixing chamber still. In other words, the possibility of air being supplied to the mixing chamber when steam and milk are being supplied to the second suction chamber via the second steam inlet and the second milk inlet, respectively, is totally precluded.

An important advantage of the solution according to the invention is, on the one hand, that it offers a solution without compromise because, as desired, either heated milk is dispensed which absolutely does not froth or heated milk is dispensed which, by contrast, frothes properly and, on the other hand, that the solution can be realized in an economically highly advantageous manner. Further, the emulsifier can simply be operated automatically and remotely, since it is possible to automatically supply steam to either the first or the second steam inlet, as desired. This implies that it can be determined remotely whether hot non-frothed milk or hot frothed milk is dispensed. A further advantage is that the amount of milk sucked in for dispensing hot milk and frothed hot milk, respectively, can be set independently of each other, so that the temperature in question can be optimally adjusted.

Preferably, the emulsifier comprises a housing which comprises the first and second suction chambers and the mixing chamber, the first and second suction chambers being spatially separated from each other, for instance by means of a partition.

Preferably, the air inlet further comprises a controllable valve for controlling the magnitude of the air stream to the first suction chamber. Thus the character of the froth formed can be set. However, the controllable valve is used solely for controlling the magnitude of the air stream and not for shutting off the air stream. This renders it possible to make the controllable valve of simple design without particularly high technical requirements being imposed, as is the case with the known emulsifier.

According to a particular embodiment, the mixing chamber comprises an outlet in fluid communication with a first and second milk outflow channel. In particular, the first and second milk outflow openings of the first and second milk outflow channel, respectively, are positioned so close to each other that milk can be dispensed from both milk outflow openings directly into a single cup. This creates the possibility of simultaneously filling one or two cups with milk, as desired. When two cups are to be filled with milk, obviously a first cup is filled from the first milk outflow opening and the second cup is filled from the second milk outflow opening. The coffee-making apparatus which comprises an emulsifier according to the present invention is preferably provided with a first and second coffee-dispensing channel with a first and second coffee outflow opening, respectively, which, in use, dispense coffee extract. Preferably, the first and second coffee outflow openings are positioned so close to each other that coffee can be dispensed from both coffee outflow openings directly into a single cup. Here, too, therefore, it is possible to fill one or two cups with coffee, as desired. More particularly, the first milk outflow opening and the first coffee outflow opening are positioned so close to each other that milk and coffee can be dispensed from the first milk outflow opening and the first coffee outflow opening, respectively, directly into a first cup and the second milk outflow opening and the second coffee outflow opening are positioned so close to each other that milk and coffee can be dispensed from the second milk outflow opening and the second coffee outflow opening, respectively, directly into the second cup. It is then possible to simultaneously fill two cups with coffee and hot milk. When moreover the first and second milk outflow opening and the first and second coffee outflow opening are positioned so close to each other that via these openings coffee and milk can be dispensed into one cup, it is possible to fill one or two cups, as desired, with black coffee, hot milk, frothed hot milk, coffee with hot milk and coffee with frothed hot milk. The invention will now be further explained with reference to the drawing, wherein:

BRIEF DESCRIPTION OF THE DRAWINGS

FIG. 2e is a top plan view of the emulsifying assembly according to FIG. 2a;

FIG. 3a is a side elevation of a first embodiment of an emulsifier of the emulsifying assembly according to FIG. 2a;

FIG. 3b is a partly broken away front view of the emulsifier according to FIG. 3a;

FIG. 3d is a top plan view of the emulsifier according to FIG. 3a;

FIG. 3e is a perspective view of the emulsifier of FIG. 3a;

FIG. 3f is a three-dimensional view of a partly exploded emulsifier according to FIG. 3a;

FIG. 5a is a side elevation of a second embodiment of an emulsifier of the emulsifying assembly according to FIG. 2a;

FIG. 5b is a partly broken-away front view of the emulsifier according to FIG. 5a;

FIG. 5c is a cross section of the emulsifier taken on the line 5c—5c in FIG. 5a;

FIG. 5d is a top plan view, partly transparent, of the emulsifier according to FIG. 5a;

FIG. 5e is a perspective view of the emulsifier of FIG. 5a;

FIG. 5f is a three-dimensional view of a partly exploded emulsifier according to FIG. 5a;

DETAILED DESCRIPTION OF THE INVENTION

Figure 1A:
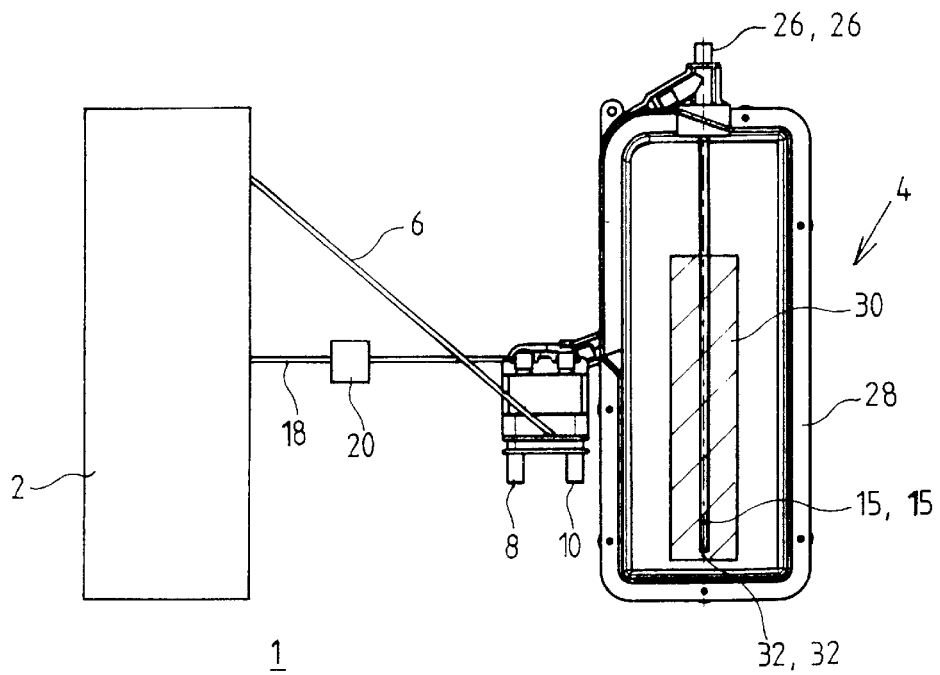
FIG. 1a is a front view of a coffee apparatus for preparing cappuccino and similar beverages.
Figure 1B:
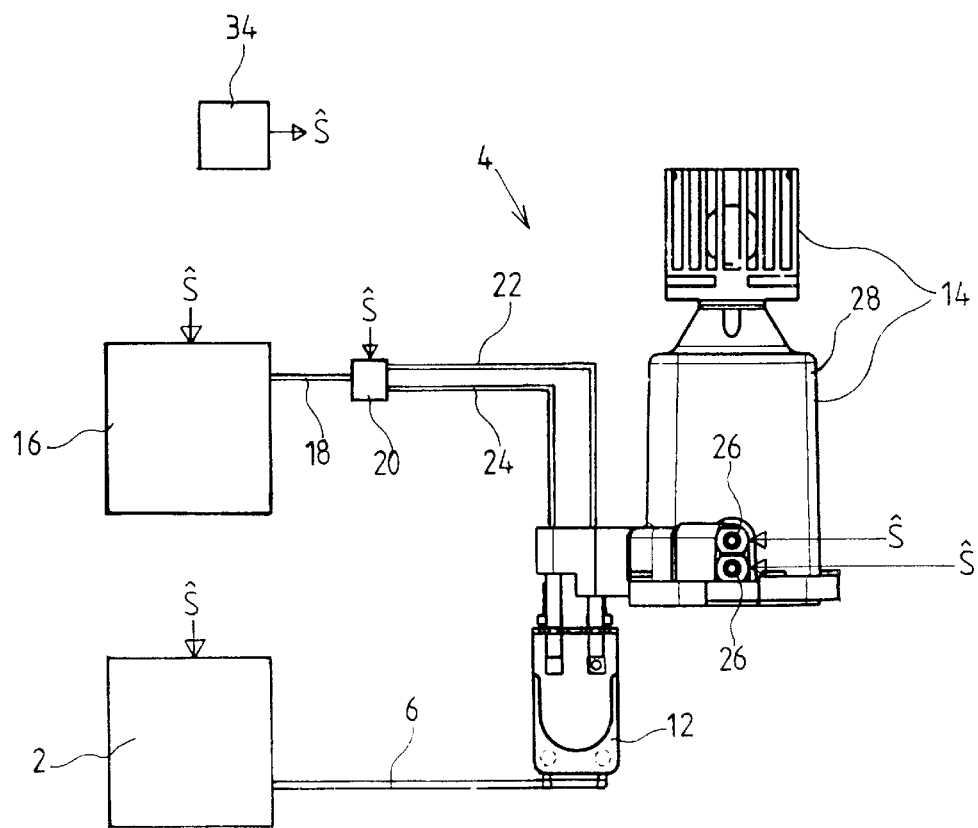
FIG. 1b is a top plan view of the coffee apparatus according to FIG. 1.

In FIGS. 1a and 1b, reference numeral 1 designates a coffee apparatus for preparing cappuccino and similar beverages. It comprises a coffee unit 2 for preparing a coffee extract and an emulsifying assembly 4 for preparing, as desired, heated frothed milk and heated non-frothed milk. The coffee unit 2 comprises a discharge channel 6 which comprises a first outflow 8 and a second outflow 10. The emulsifying assembly 4 comprises a mixing device 12 suitable for mixing steam and milk for obtaining heated milk. In this example, the mixing device further comprises an air inlet for additionally adding air to the milk for obtaining heated frothed milk. In this example, the mixing device consists of an emulsifier and accordingly will be designated hereinafter as emulsifier 12.

The emulsifying assembly further comprises a cooling device 14 in which a milk-filled container can be arranged for dispensing cooled milk. This cooled milk is supplied via a first or second milk supply duct 15a, 15b, to be discussed hereinafter, to a first or second milk inlet of the emulsifier 12.

The emulsifying assembly further comprises a steam generator 16 which dispenses steam via a steam duct 18 to a selection means 20. The selection means 20, settable as desired, dispenses the steam supplied by the steam generator 16 via the steam duct 18 to a first downstream duct 22 or a second downstream duct 24.

The first milk supply duct 15a further comprises an aeration valve 26a while the second milk supply duct 15b comprises an aeration valve 26b. The aeration valve 26a and 26b in this example are arranged on top of the cooling device 14. The cooling device 14 consists in this example of a cooling unit 28, which comprises a cooled space surrounded by chamber walls, in which space the milk container mentioned can be placed. This milk container is, for instance, a carton of milk 30, as shown in hatching in FIG. 1a. The milk supply ducts 15a and 15b comprise a second open end 32a, 32b which is in fluid communication with the milk disposed in the milk carton 30. In this example the two open ends 32a and 32b are situated nearly on the bottom of the carton of milk.

Finally, the emulsifying assembly further comprises a control unit 34 which generates control signals S and, through them, controls the coffee unit 2, the steam generator 16, the selection means 20 and the aeration valves 26a and 26b.

In this example the walls of the cooling unit 28 are made substantially of a metal. The emulsifying assembly further comprises a cooling element 36 known per se, with which the walls of the cooling unit 28 can be cooled. A further elaboration of the cooling device 14 will now be discussed with reference to FIG. 2. The cooling unit 28 comprises a bottom wall 38, upright sidewalls 40a, 40b, 40c, 40d, and a top wall 42. The sidewall 40d is detachably connected with the rest of the cooling unit 28 and can, for instance, be removed to place in the space 44 surrounded by the chamber walls 40a, 40b, 40c, 40d, 38 and 42 a milk-filled container in the form of a carton of milk 30.

Figure 2A:
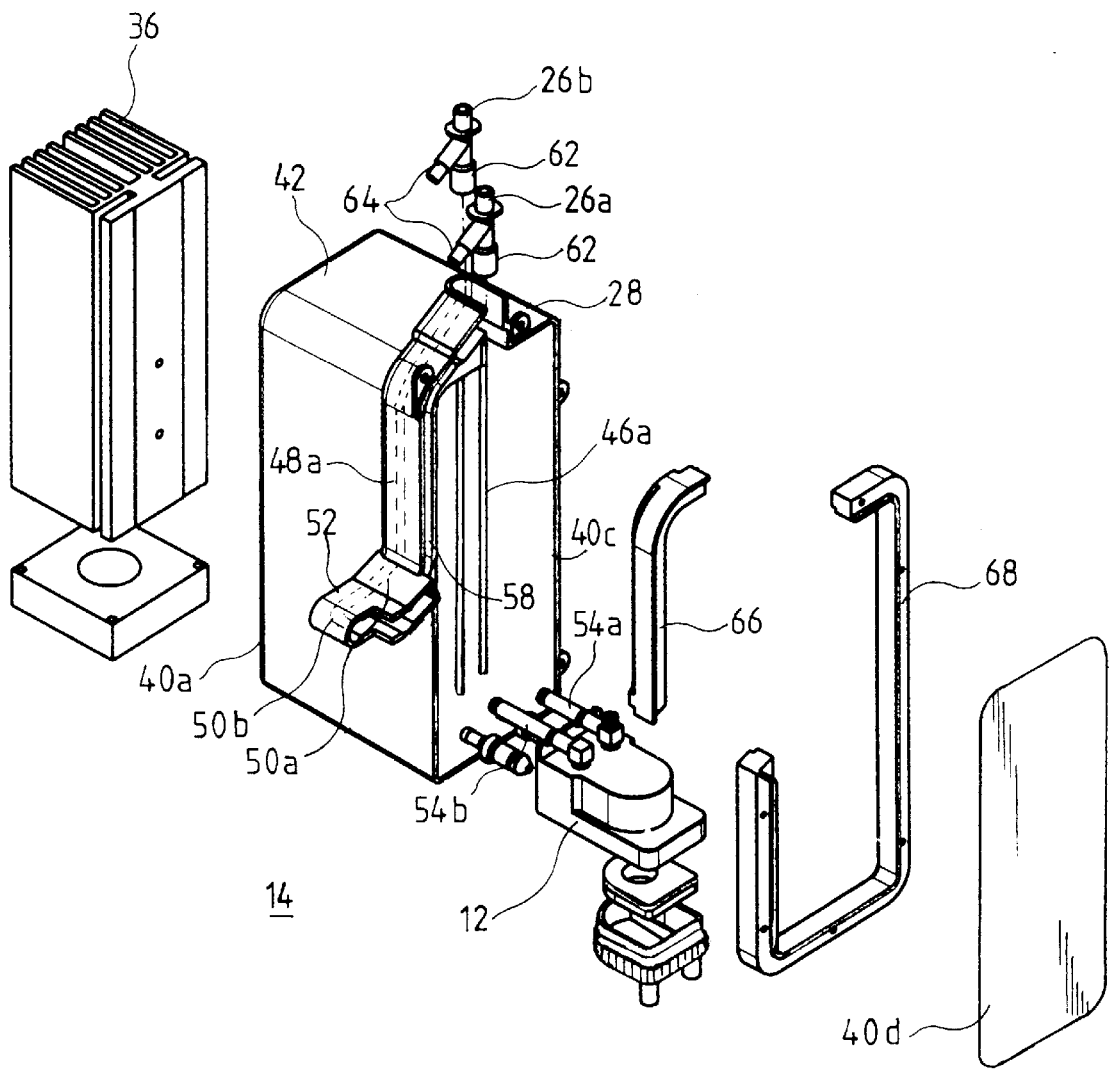
FIG. 2a is a perspective view of a partly exploded emulsifying assembly of the coffee apparatus according to FIG. 1.
Figure 2B:
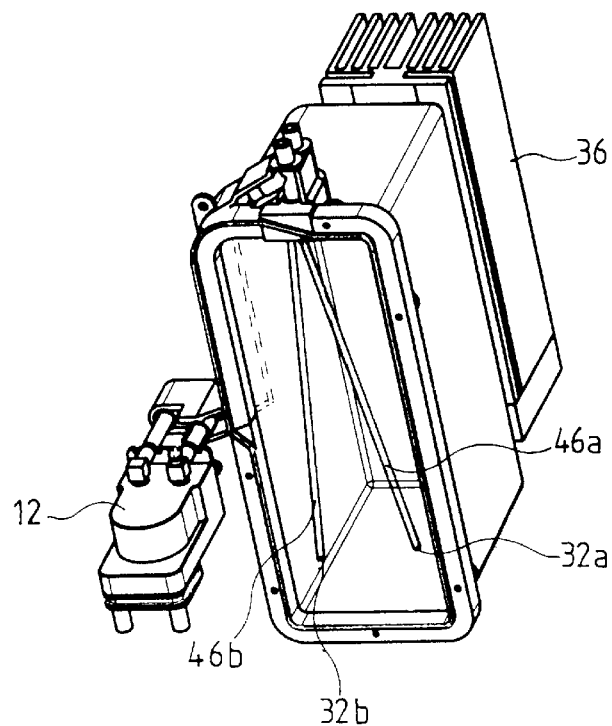
FIG. 2b is a three-dimensional view of the emulsifying assembly according to FIG. 2a, with a front wall removed.
Figure 2C:
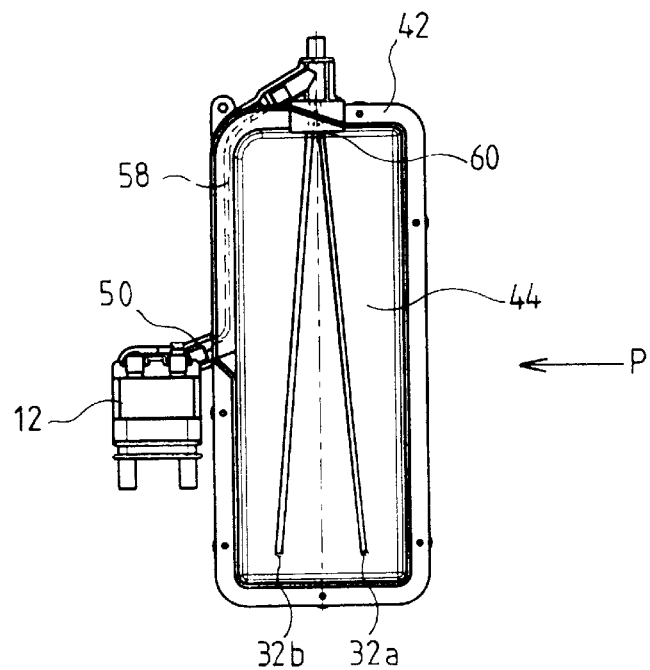
FIG. 2c is a front view of the emulsifying assembly according to FIG. 2b.
Figure 2D:
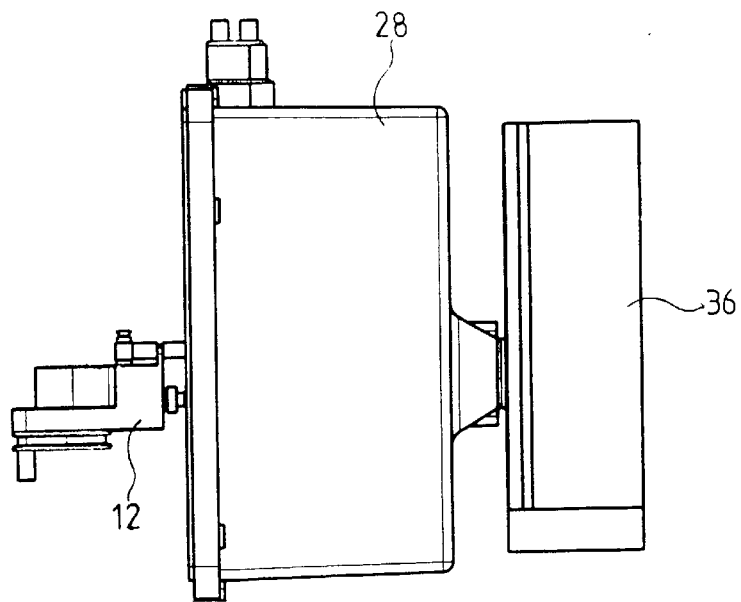
FIG. 2d is a side view in the direction of the arrow P of FIG. 2c.
Figure 2E:
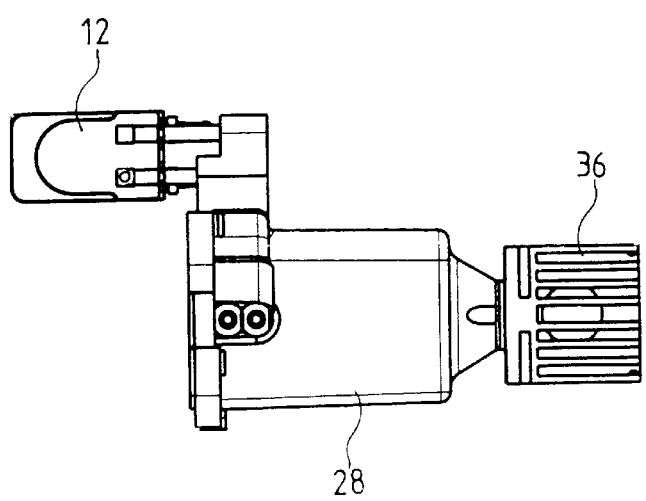

As can be suitably seen in FIGS. 2a, 2b and 2c, the first and second aeration valves 26a and 26b are arranged externally on the top wall 42. Extending vertically downwards from the first aeration valve 26a into the space 44 is a part 46a of the milk supply duct 15a. The part 46a of the milk supply duct is of flexible design, so that it can easily be manipulated in a carton of milk. Further, from the first aeration valve 26a a second part 48a of the milk supply duct 15a extends in a hollow space of the top wall 42 and the upright sidewall 40a. The upright sidewall 40a comprises externally thereof an outlet opening 50 through which the second part 48a of the duct 15a projects partly outside. The part of the duct 15a which projects outside ends in a first open end 50a. The open end 50a is situated in a holder 52 mounted on the upright sidewall 40a.

The first milk supply duct 15a accordingly comprises a first open end which in this example extends to a point outside the cooling unit 28 and a second open end situated in the interior 44 of the cooling unit 28. Inasmuch as the first part of the milk supply duct 15a extends substantially within the space 44, while the second part 48a of the duct 15a extends substantially through a hollow space in the chamber walls, the first milk supply duct 15a extends substantially inside the cooling unit.

The second milk supply duct 15b together with the second aeration valve 26b is mounted in the cooling unit 28 in a manner entirely analogous to that discussed in relation to the milk supply duct 15a.

The emulsifier 12 comprises a first milk inlet 54a, a second milk inlet 54b, a first steam inlet 56a and a second steam inlet 56b. The emulsifier 12 comprises a housing which is detachably connected to the cooling unit 28, in this case in particular detachably connected to the holder 52. FIG. 2a shows the emulsifier 12 when detached from the cooling unit 28. The other drawings of FIG. 2 show the emulsifier 12 when connected to the holder 52 of the cooling unit 28. In this last condition, the first open end 50a of the milk supply duct 15a is connected to the first milk inlet 54a. Also, the first open end 50b of the second milk supply duct 15b is connected to the second milk inlet 54b. The first steam inlet 56a and the second steam inlet 56b in use are connected to the first downstream duct 22 and the second downstream duct 24, respectively. See also FIG. 1. It is noted that the first and second milk inlet 54a, 54b of the emulsifier 12 are situated adjacent the cooling unit 28, so that the milk supply duct extends at least substantially completely inside the cooling unit (see also FIGS. 2b and 2c).

In this example, the first and second open end 50a and 50b of the milk supply ducts 15a and 15b are connected through a snap connection which is known per se to the first and second milk inlet 54a and 54b, respectively. The emulsifier 12 therefore can be pulled off the cooling unit, for instance to be cleaned, and subsequently be re-placed again.

FIG. 2a depicts the emulsifying assembly in partly disassembled condition. The hollow space extending in the top wall 42 and the sidewall 40a is designated with reference numeral 58. The top wall 42 is internally provided with an opening 60 through which the milk supply ducts 15a, 15b extend from the hollow space 58 in the wall 42 into the cooled space 44. In this example, the aeration valves 26a and 26b are assumed to be part of the milk supply ducts 15a and 15b. The opening 60 in this example extends from the inside of the cooling unit to the outside of the cooling unit (see FIG. 2a). These openings are closed again by the aeration valves when they are in assembled condition (see FIG. 2b). Each aeration valve comprises an inlet opening 62 and an outlet opening 64. The inlet openings 62 are respectively connected to the flexible parts 46a and 46b of the ducts 15a and 15b. The outlet openings 64 are connected to the parts 48a and 48b of the ducts 15a and 15b.

Because the hollow space 48, for the purpose of assembling the ducts, is open at the front of the cooling unit, the cooling unit further comprises a first insulating edge member 66 with which the hollow space 58 can be closed off. For the sake of symmetry, the cooling unit further comprises a second insulating edge member 68 which, in assembled condition, together with the first edge part, forms a closed ring. The milk supply ducts 15a and 15b are detachably connected to the rest of the assembly. By removing the first edge member 66, the milk supply ducts can be removed, for instance to clean or replace them. The upright sidewall 40d comprises means which are known per se, capable of detachably connecting it to the first and second edge member 66 and 68 in order to close off the cooling unit 28. Accordingly, the edge member 40d constitutes a kind of door which can be opened to place a carton of milk in the space 28 and which can subsequently be closed.

The cooling element 36 is likewise detachably connected to the cooling unit 28. Additionally, arranged at the lower end of the cooling element is a fan which has the function of cooling the cooling element.

The walls of the cooling unit 28 are substantially made of a metal. The cooling element is mounted on the wall 40b (see FIGS. 2b–2e). The cooling element accordingly cools the upright sidewall 40b directly. Inasmuch as all of the walls are made of metal and hence can conduct heat well, all of the walls will be cooled by the cooling element 36. The hollow space 58 will also be cooled. The duct parts 46a, 46b are obviously cooled because they are situated in the space 44. The holder 52 in this example is also made of metal, so that it is cooled too. This means that both milk supply ducts 15a and 15b in this example are cooled.

As appears from FIG. 2, the second ends 32a and 32b of the milk supply ducts 15a and 15b are situated at a level lower than the highest point of the respective milk supply ducts. The highest point of the milk supply ducts in this example is formed by the aeration valves 26a and 26b. Inasmuch as the second ends 32a and 32b are situated below the highest points referred to, the carton of milk 30 cannot drain of itself when the aeration valves are opened. In this example, both milk supply ducts are of substantially U-shaped design and so oriented that each milk supply duct extends in upward direction from the first and the second end, respectively. In this example, the aeration valves 26a and 26b are arranged at the highest point of the milk supply ducts 15a and 15b, respectively.

If with the aid of emulsifier 12 via the milk supply duct 15a or via the milk supply duct 15b milk being sucked in, the supply duct 15a, 15b will be filled entirely with milk. When thereupon suction is stopped, the liquid flow in the milk supply duct 15a, 15b comes to a standstill and liquid residues will be left behind in this duct. Now, the important purpose of the aeration valve is to prevent this. By opening the aeration valve 26a, 26b, the duct 15a, 15b is aerated and residues of liquid can flow back to the carton of milk 30 or flow further to the emulsifier 12. It is noted that for this function of the aeration valve it is not relevant where exactly in the milk supply duct 15a, 15b it is arranged. In other words, for the purpose of this function, the aeration valve can in principle be arranged at any point of the milk supply duct 15a, 15b.

In some embodiments, however, it is also desired to avoid siphon action. When, as described hereinabove, it is attempted to stop the milk flow through a milk supply duct 15a, 15b by ending suction of milk using the emulsifier 12; it is possible that the milk flow, even after suction has been stopped, is not ended owing to siphon action. Siphon action can occur in particular when the first end 50a, 50b, viewed in vertical direction, is lower than the height of the liquid level in the carton of milk 30. By opening the aeration valve 26a, 26b, the milk supply duct 15a, 15b will be aerated and the siphon action ended. It is noted that for the purpose of this function not any random position of the aeration valve 15a, 15b is permitted. When the aeration valve 15a, 15b is situated in the part 48a, 48b of the duct 15a, 15b, the aeration valve should be disposed at a height which, in use, is above the level of the liquid surface in the carton of milk 30. If this were not the case, the milk would flow out via the aeration valve itself. If, on the other hand, the aeration valve is arranged in the flexible part 46a, 46b of the duct 15a, 15b, it should for the same reason be arranged above the level of the liquid surface. In order to be able to properly fulfil both functions, the aeration valve will preferably be arranged at least at a level above the second end of the relevant milk supply duct. Ideally, however, as shown in FIG. 2, the aeration valve is disposed at the highest point of the milk supply duct in question, since it can then function properly at all times, regardless of the liquid level.

Referring to FIG. 3, now the emulsifier 12 will be further explained. The emulsifier, as already mentioned, comprises the first and second steam inlet 56a and 56b and a first and second milk inlet 54a and 54b. The emulsifier further comprises an air inlet 72 which in this example is in direct communication with the first milk inlet 54a. This air inlet 72 further comprises a controllable valve 74 for controlling the magnitude of the air stream through the air inlet 72.

The emulsifier further comprises a first suction chamber 76a and a second suction chamber 76b. The first and second suction chamber 76a and 76b are spatially separated from each other. The first steam inlet 56a opens into the first suction chamber 76a. The second steam inlet 56b opens into the second suction chamber 76b. The first milk inlet 54a and hence also the air inlet 72 likewise open into the first suction chamber 76a. The second milk inlet 54b opens into the second suction chamber 76b. Further, the first and second suction chamber 76a, 76b are in fluid contact via duct 77a and 77b, respectively, with a mixing chamber 78. The mixing chamber 78 comprises a bottom 80 which comprises an outlet in the form of an opening 82. Via this outlet 82, the mixing chamber 78 terminates in a distribution chamber 84 located under the mixing chamber. The distribution chamber 84 comprises a bottom with a first and second milk outflow channel 86a and 86b with, respectively, a first and a second milk outflow opening 88a, 88b.

Figure 3A:
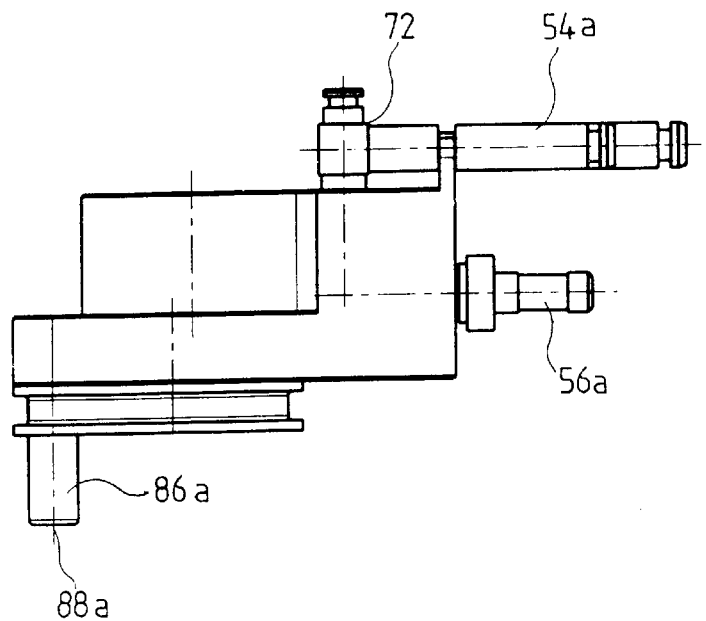
Figure 3B:
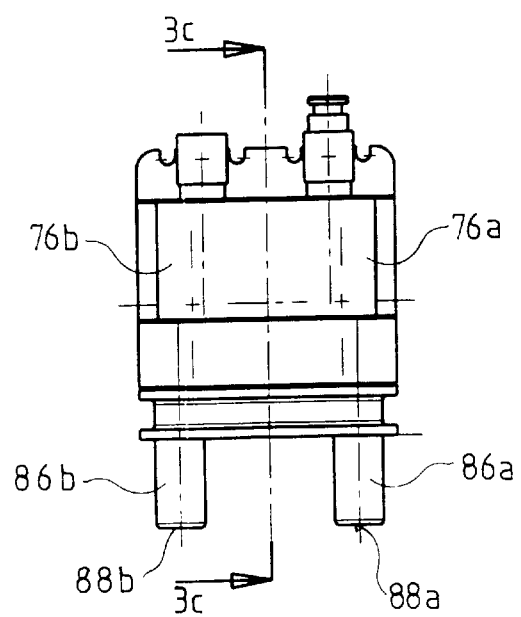
Figure 3C:
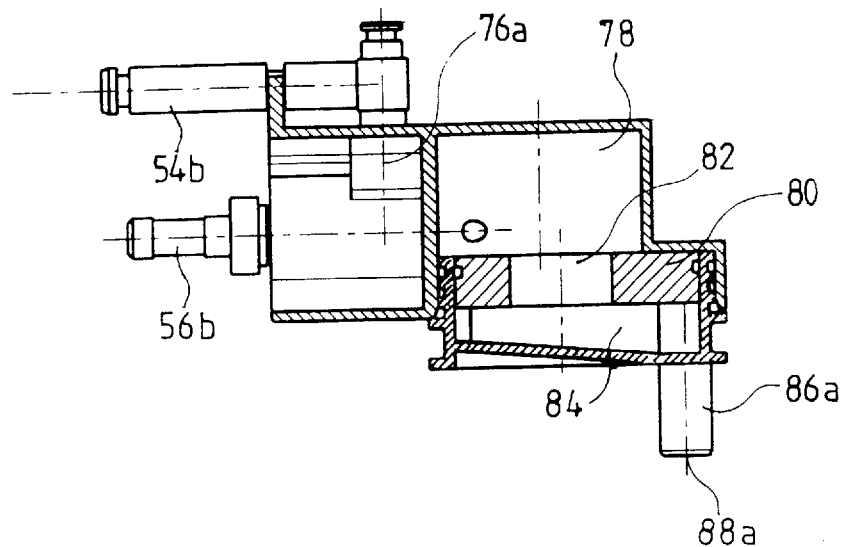
FIG. 3c is a cross section of the emulsifier taken on the line 3c—3c in FIG. 3b.
Figure 3D:
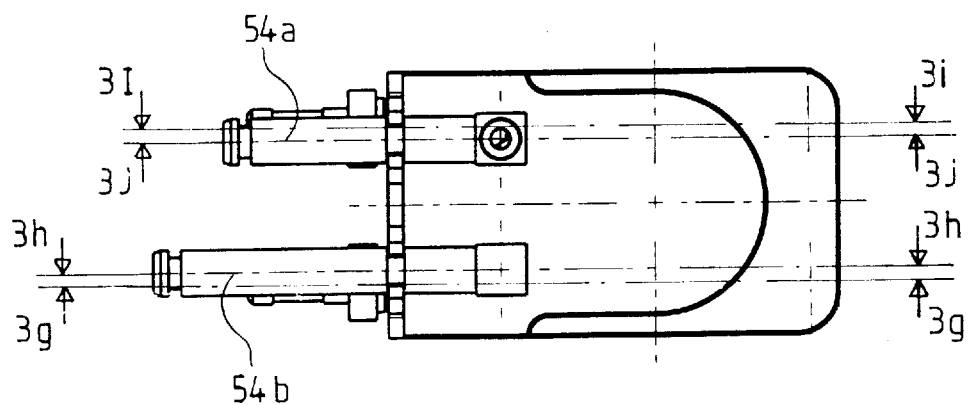
Figure 3E:
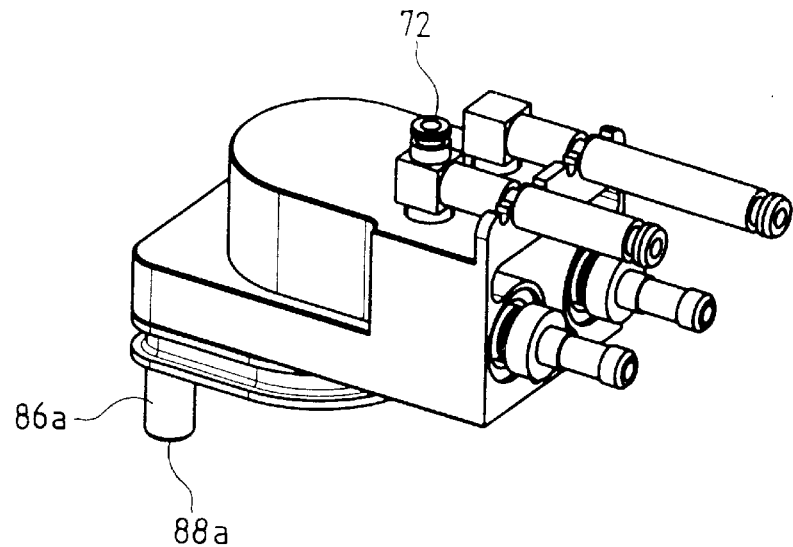
Figure 3F:
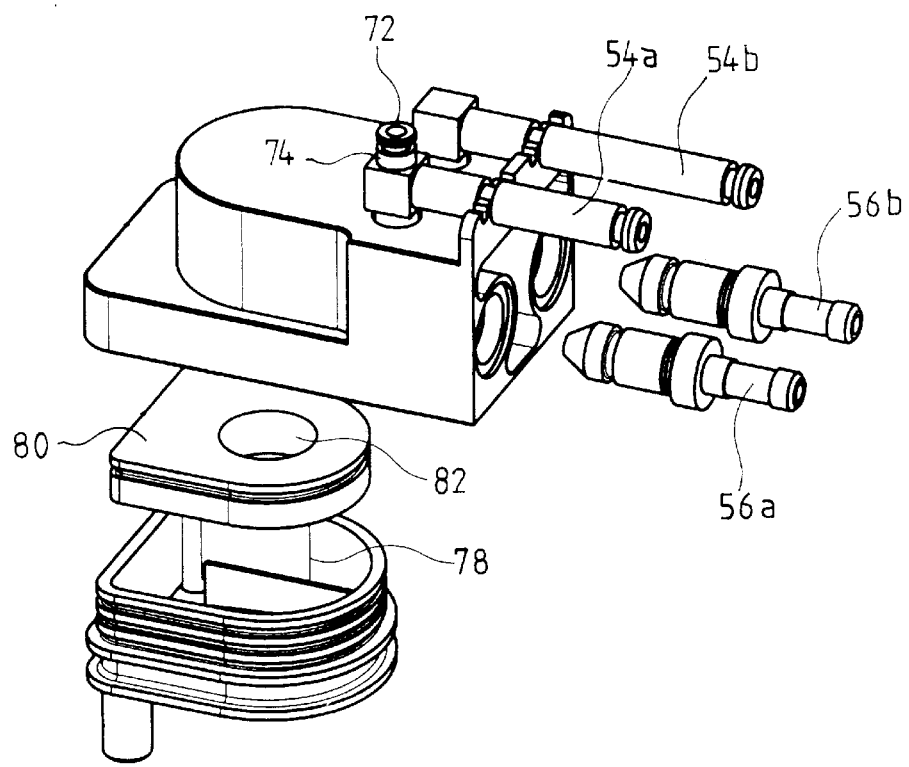
Figure 3G:
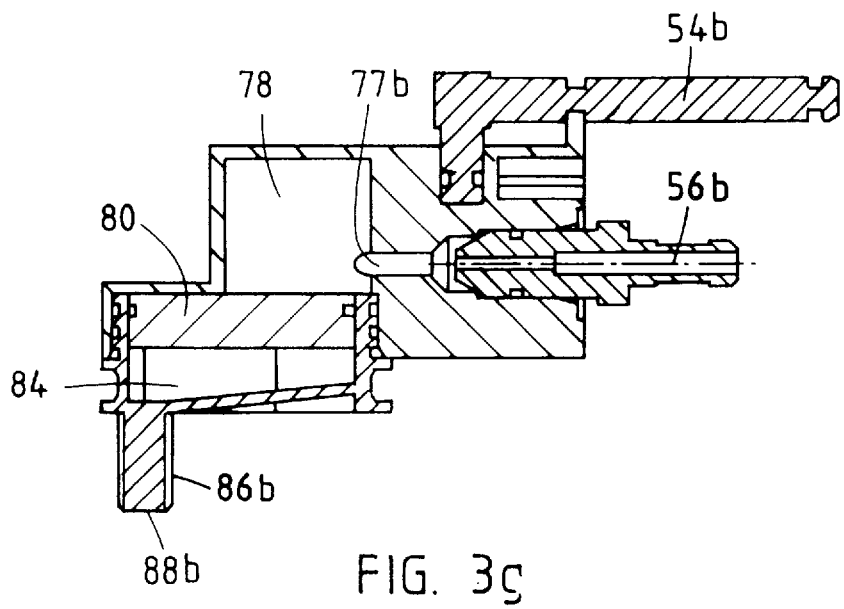
FIG. 3g is a first longitudinal section of the emulsifier taken on the line 3g—3g in FIG. 3d.
Figure 3H:
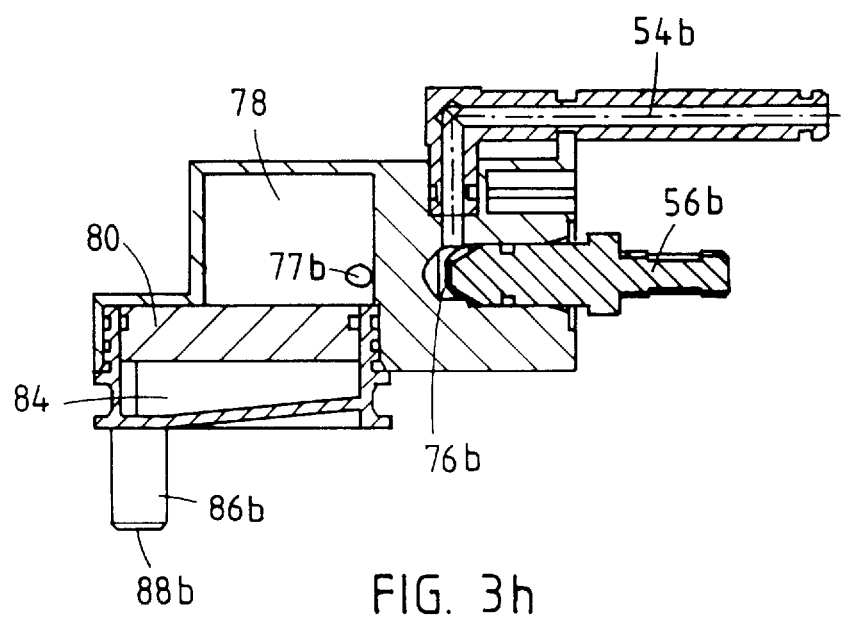
FIG. 3h is a second longitudinal section of the emulsifier taken on the line 3h—3h in FIG. 3d.
Figure 3I:
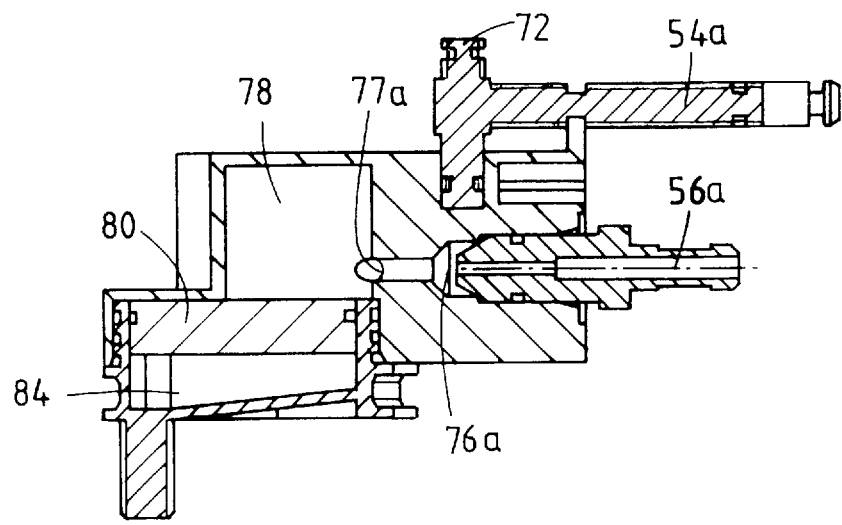
FIG. 3i is a third longitudinal section of the emulsifier taken on the line 3i—3i in FIG. 3d.
Figure 3J:
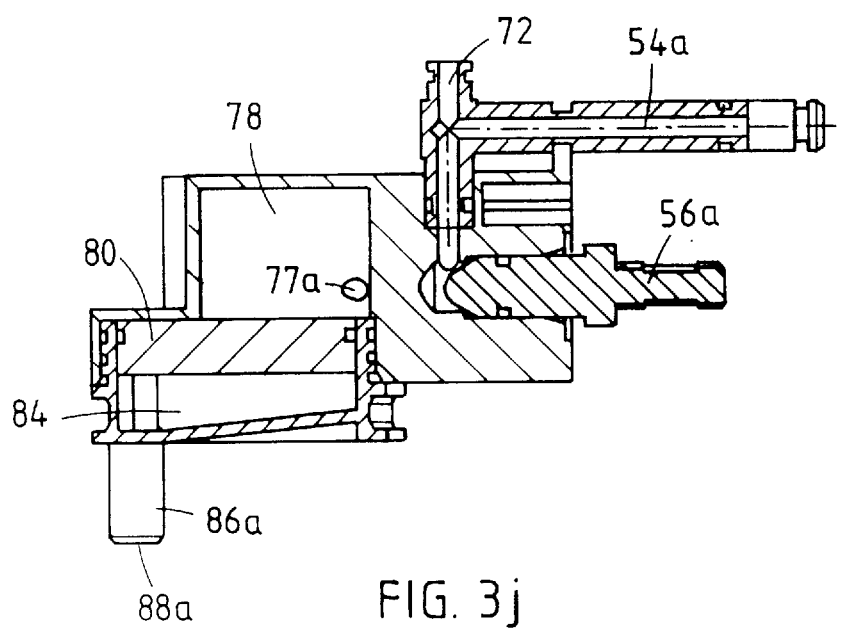
FIG. 3j is a fourth longitudinal section of the emulsifier taken on the line 3j—3j in FIG. 3d.

As can be seen in FIG. 3f, the first and second milk inlet, the first and second steam inlet, the mixing chamber 78, the distribution chamber 84 and the bottom 80 together with the other components of the emulsifier can be assembled from loose parts. However, this is not essential to the invention and only intended as an illustration of a possible embodiment.

The operation of the coffee apparatus is as follows. It is preliminarily remarked that in this example the first and second outflow 8, 10 of the discharge channel 6 and the first and second milk outflow opening 88a and 88b of the emulsifier 12 are arranged in such mutual proximity that they can all four of them dispense liquid directly into one cup. When it is presently the desire of the user to prepare a cup of cappuccino, the control unit 34 will activate the steam generator 16 for preparing steam. The steam is supplied via the steam duct 18 to the selection means 20. The control unit 34 controls the selection means 20 in such a manner that the steam is supplied only to the first downstream duct 22. Accordingly, no steam is supplied to the downstream duct 24. The result is that the first steam inlet 56a of the emulsifier 12 is supplied with steam. This steam will end up in the first suction chamber 76a. As a result, in this suction chamber a reduced pressure will arise since the suction chamber 76a will function as a venturi system. The result is that the first suction chamber 76a will draw in milk and air via the milk inlet 54a and the air inlet 72, respectively. The combination of milk, air and steam will thereupon flow at a high velocity to the mixing chamber 78, where the ingredients in question are properly mixed with each other. The bottom 80 with the opening 82 of the mixing chamber here functions as a "hold up" ensuring that the residence time of the mixture in the mixing chamber 78 is sufficiently long for the milk to be properly heated under the influence of the steam and to form froth under the influence of the air. The end result is that frothed milk is supplied to the distribution chamber 84. This frothed milk will leave the distribution chamber via the milk outlet openings 88a and 88b and fill a cup placed under these milk outlet openings. To control the nature of the frothed milk, the air stream can, if desired, be adjusted via the controllable valve 74. This can be done manually.

The control unit 34 will also activate the coffee unit 2. The activation of the coffee unit 2 can occur concurrently with the activation of the steam generator 16. It is also possible, however, first to activate the steam generator 16 and then the coffee unit 2 or first to activate the coffee unit 2 and then the steam generator 16. The order in which eventually the coffee extract and the frothed milk are dispensed into a cup can therefore be varied. When the coffee unit 2 is activated, it will prepare a coffee extract which flows via the drain channel 6 to the first and second outflow 8, 10. The coffee extract will be poured into the cup via the first and second outflow 8, 10. The cappuccino is presently ready for consumption.

If, however, it is intended that a cup of coffee is prepared which consists of coffee extract with hot milk which expressly does not froth (café au lait), the control unit 34 will again activate the steam generator 16 as described hereinbefore. Now, however, the control unit 34 controls the selection means 20 such that steam is fed to the second downstream duct 24 while no steam is fed to the first downstream duct 22. The result is that steam is fed solely to the second steam inlet 56b of the emulsifier 12. This steam will flow to the second suction chamber 76b. Thus in the second suction chamber 76b, which again functions as a venturi system, a reduced pressure will be created, so that milk is drawn in via the second milk inlet 54b. Because the second suction chamber 76b is separated from the first suction chamber 76a, no air will be sucked to the second suction chamber 76b. Accordingly, from the second suction chamber 76b, a mixture of milk and steam will flow to the mixing chamber 78. In the mixing chamber 78 too, no air will be sucked in via the air inlet 72, since in the mixing chamber 78 an excess pressure is created, so that it is not possible for liquid or air to flow from the first suction chamber to the mixing chamber. In the mixing chamber 78 the milk is thereupon heated properly with the steam, and the residence time of the milk in the mixing chamber will be sufficient for a considerable heat transfer between the steam and the milk. The bottom together with the opening 82 here functions as a "hold up" again. The hot milk will thereupon flow to the distribution chamber 84 and leave the distribution chamber, divided over the outlet openings 88a and 88b. The cup which has been placed under the milk outlet openings 88a, 88b will therefore be filled with a black coffee extract and hot milk which absolutely does not froth. It is noted that the emulsifier in this example is operated automatically, since through the selection of the steam inlet to which steam is supplied, a choice is made between the dispensing of hot non-frothed milk and hot frothed milk.

When, for instance, frothed milk has been dispensed, the control unit 34 will in any case open the aeration valve 26a and possibly also the aeration valve 26b. Also, the steam generator 16 is deactivated. This means that in this example no steam is supplied to the first suction chamber 76a anymore, so that the first suction chamber also will not suck in any milk anymore via the milk supply duct 15a. To prevent milk from continuing to flow through the milk supply duct 15a anyway as a result of siphon action, the control unit 34 opens the aeration valve 26a. It will be clear that when hot non-frothed milk has been dispensed, the control unit 34 activates the steam generator 16 and opens at least the aeration valve 26b.

When it is desired to heat up and/or clean the emulsifier 12, the control unit 34 opens the first and/or the second aeration valve 26a, 26b. Also, the steam generator 16 is activated. The selection means 20 is set such that steam is supplied to the first downstream duct when the aeration valve 26a is opened, to the second downstream duct when the aeration valve 26b is opened or to both downstream ducts when both aeration valves are opened. Assuming that both aeration valves are opened, the steam inlets 56a and 56b are accordingly supplied with steam. This steam will flow through to the first and second suction chamber 76a and 76b. However, because the aeration valves 26a and 26b are opened, the milk supply ducts 15a and 15b are aerated with the result that no milk is sucked from the carton 30. Instead, via the aeration valve 26a and 26b, air is sucked in, which flows to the first and second suction chambers 76a and 76b. The steam flows via the suction chamber to the mixing chamber, distribution chamber to subsequently leave the emulsifier via the milk outflow channels 86a and 86b. The result is that any milk residues that have been left in the emulsifier are entrained and carried off by the steam.

Another result is that the emulsifier 12 is heated up. When the emulsifier is subsequently used for preparing hot frothed milk or hot milk, milk of a desired temperature will be dispensed directly without the temperature of the milk that is being dispensed running up slowly over time. Further, this milk will be entirely pure because the emulsifier has priorly been blown clean entirely.

It is noted that opening the aeration valves 26a and 26b after milk has been dispensed by the emulsifier is also advantageous in that any milk residues will drain from the milk supply ducts 15a and 15b. Thus, not only siphon action is prevented, but also milk residues are prevented from being left behind in the ducts in question.

Figures 4A, 4B, 4C:
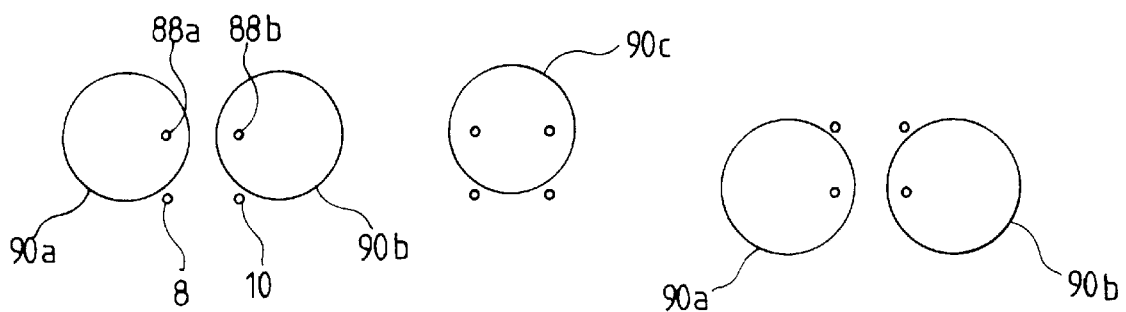
FIGS. 4a–4f show a possible use of the coffee apparatus according to FIG. 1.
Figures 4D, 4E, 4F:
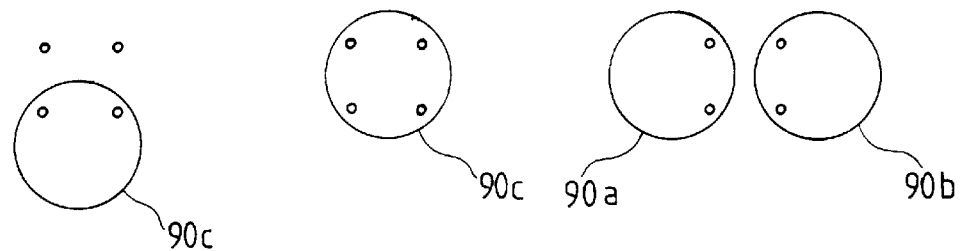
Figure 5A:
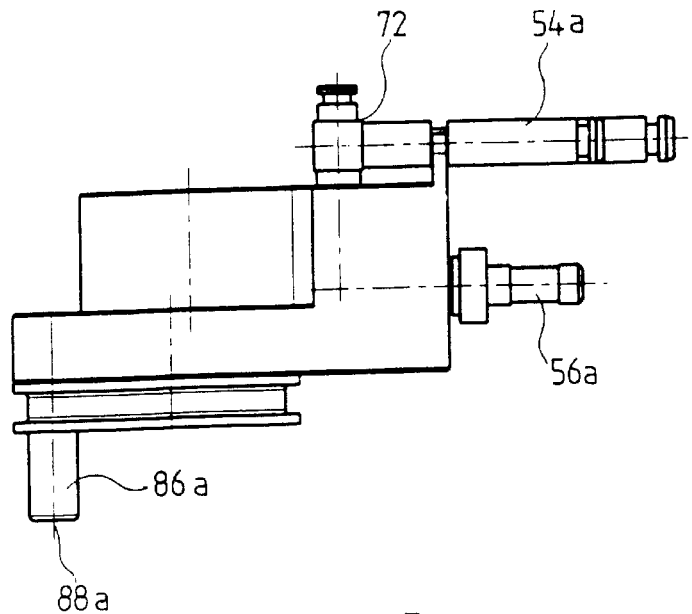
Figure 5B:
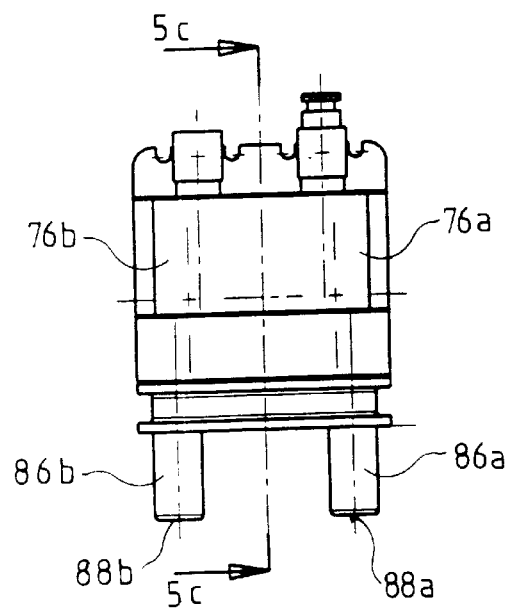
Figure 5C:
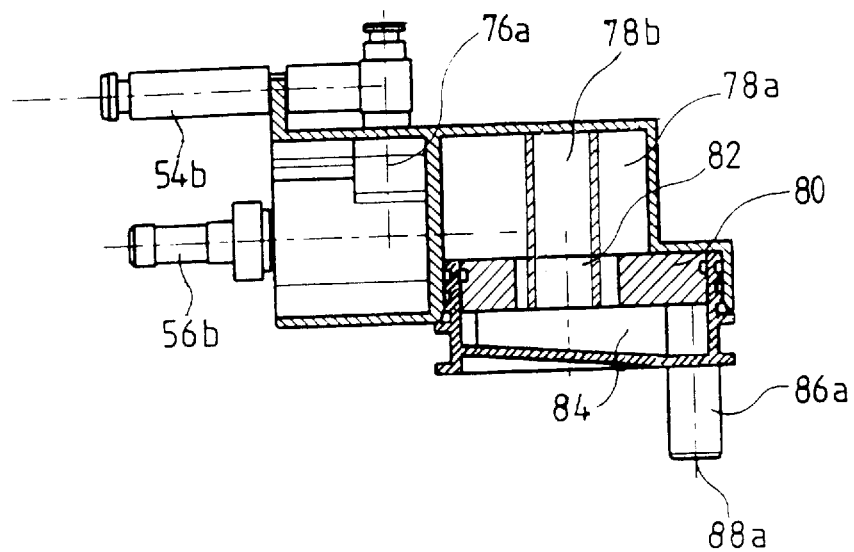
Figure 5D:
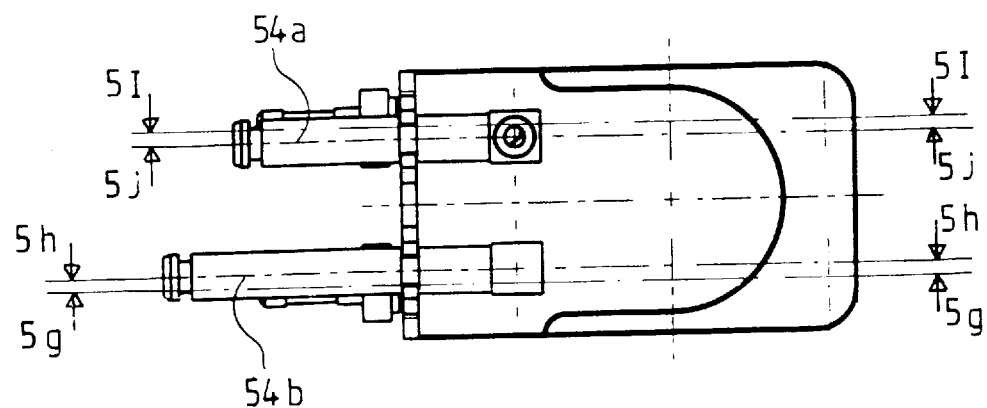
Figure 5E:
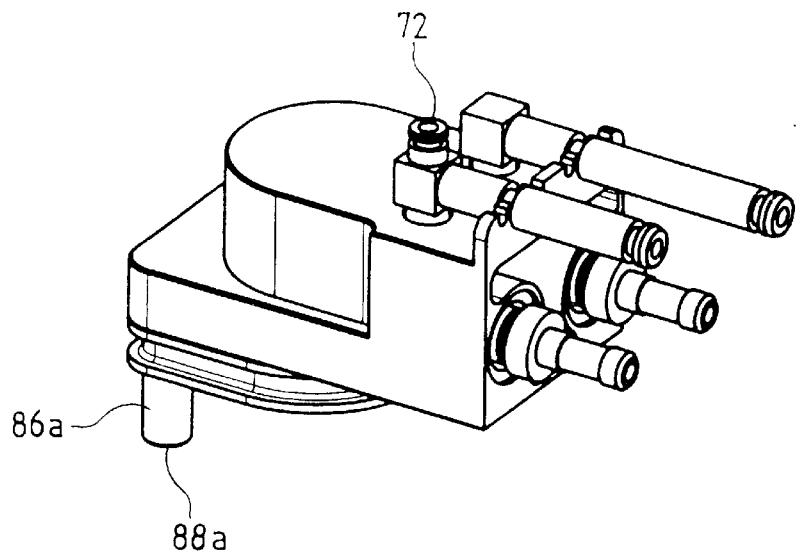
Figure 5F:
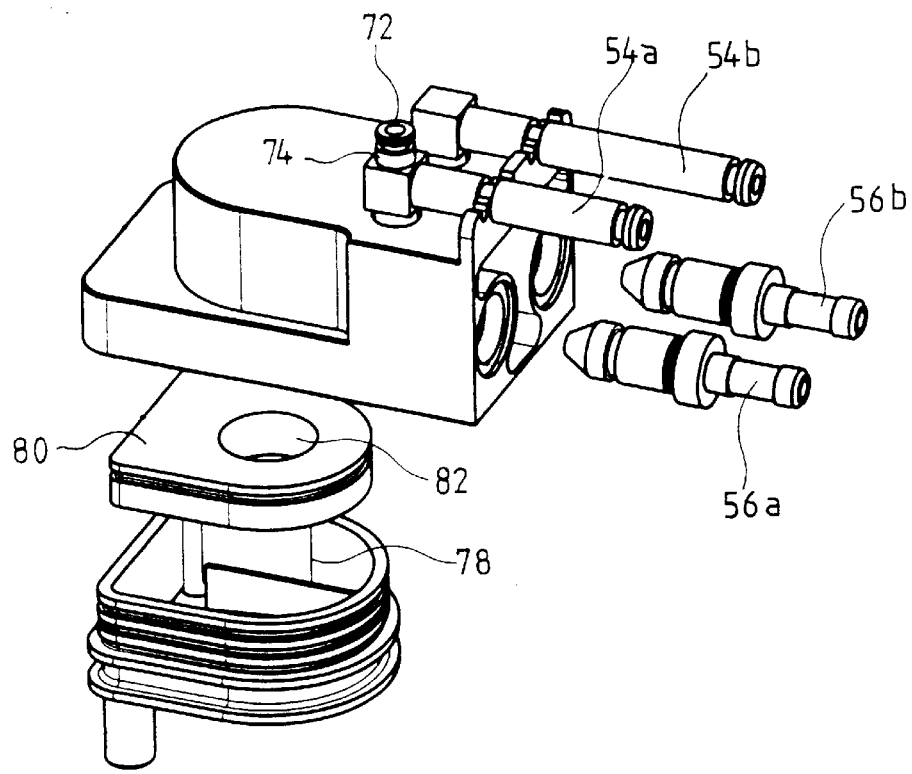
Figure 5G:
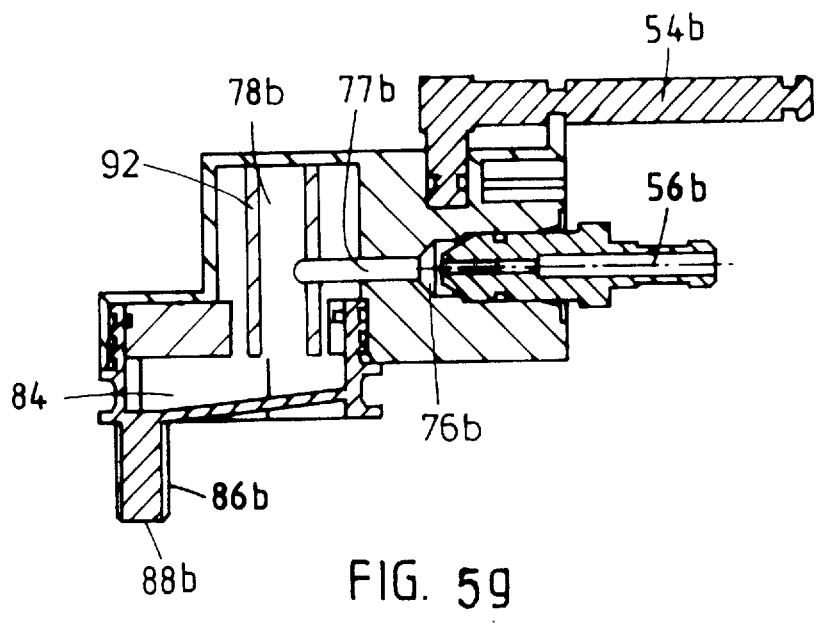
FIG. 5g is a first longitudinal section of the emulsifier taken on the line 5g—5g in FIG. 5d.
Figure 5H:
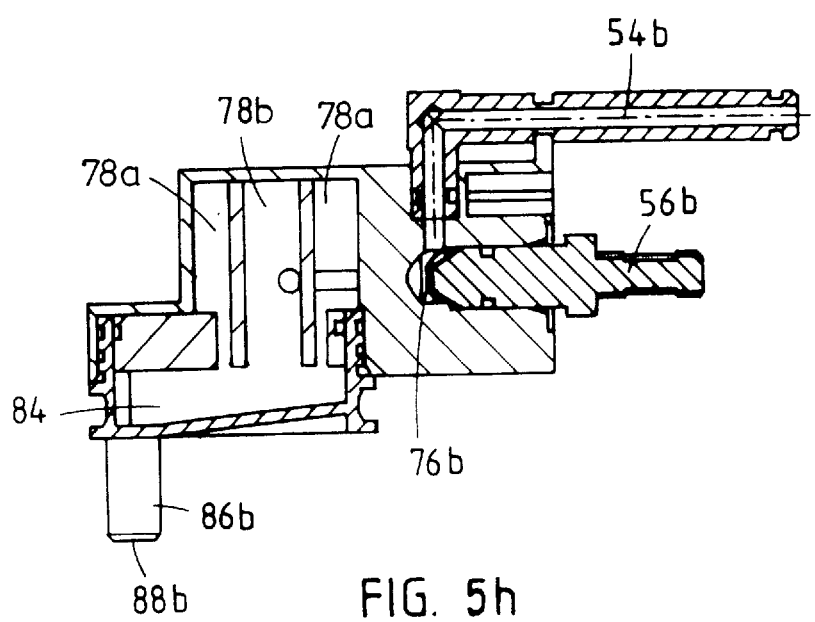
FIG. 5h is a second longitudinal section of the emulsifier taken on the line 5h—5h in FIG. 5d.
Figure 5I:
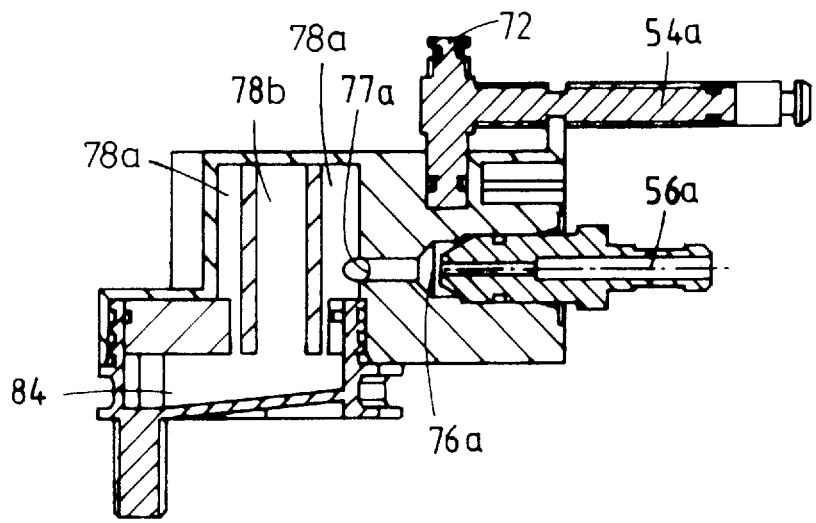
FIG. 5i is a third longitudinal section of the emulsifier taken on the line 5i—5i in FIG. 5d.
Figure 5J:
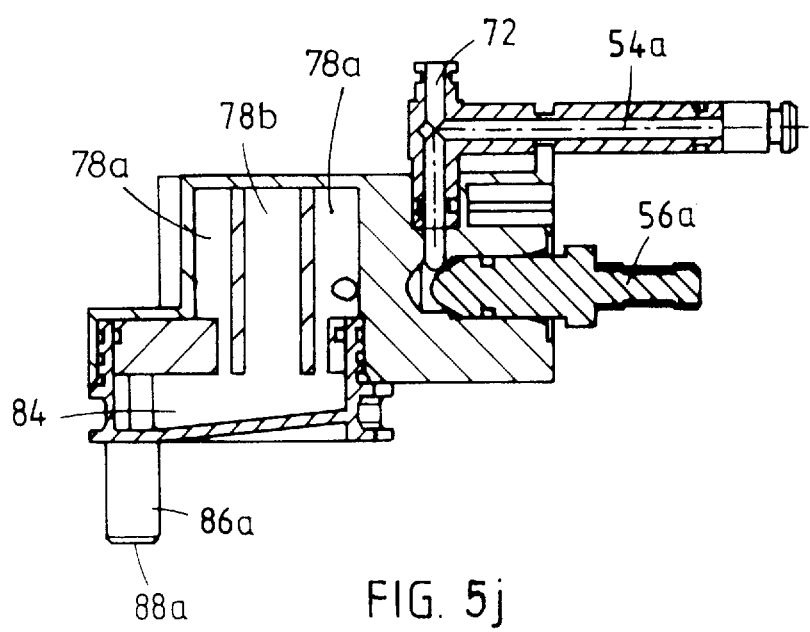
FIG. 5j is a fourth longitudinal section of the emulsifier taken on the line 5j—5j in FIG. 5d.

If desired, it is also possible to fill two cups with hot milk. In that case, a first cup 90a is placed under the milk outlet opening 88a and a second cup 90b under the milk outlet opening 88b (see FIG. 4a). However, the first and second milk outlet opening 88a and 88b are arranged so close to each other that milk can also be dispensed from both milk outlet openings directly into one cup 90c (see FIG. 4b). The same applies to the first and second outflow opening 8, 10 for the coffee extract. If it is desired to fill two cups 90a, 90b with coffee extract, the cup 90a can be placed under the coffee extract outflow opening 8, while the cup 90b can be arranged under the coffee extract outflow opening 10 (see FIG. 4c). However, the first and second coffee outflow opening are positioned so close to each other that coffee can be dispensed from both coffee outflow openings directly into a single cup (see FIG. 4d). Moreover, in this example the first milk outflow opening 88a and the first coffee outflow opening 8 are positioned so close to each other that milk and coffee can be dispensed from these openings directly into a cup 90a (see FIG. 4f). Moreover, the second milk outflow opening 88b and the second coffee outflow opening 10 are positioned so close to each other that milk and coffee can be dispensed from these openings directly into a second cup 90b (see FIG. 4f). In particular, the first and second milk outlet opening and the first and second coffee outflow opening are positioned so close to each other that via these openings coffee and milk can be dispensed directly into a cup 90c (see FIG. 4e). Thus, as desired, coffee extract can be supplied to one or two cups, hot non-frothed milk to one or two cups, hot frothed milk to one or two cups, coffee extract together with hot non-frothed milk to one or two cups, and coffee extract together with frothed hot milk to one or two cups. It will be clear that for the mere preparation of coffee extract or hot milk, the control unit 34 will activate only the coffee unit 1 or the steam generator 16.

FIGS. 5a–5j show a second possible embodiment of an emulsifier according to the invention, in which parts corresponding with FIG. 3 have been given the same reference numerals as in FIG. 3. Unlike the emulsifier of FIG. 3, the emulsifier according to FIG. 5 comprises a first and second mixing chamber 78a and 78b. The first suction chamber 76a is in fluid communication with the first mixing chamber 78a. Further, the second suction chamber 76b is in fluid communication with the second mixing chamber 78b. The second suction chamber 78b is bounded by a tubular upright wall 92. The second mixing chamber 78b is open at its underside and opens into the distribution chamber 84. Arranged on the outside of the second mixing chamber is the first mixing chamber 78a. The two mixing chambers are therefore concentric. The second mixing chamber 78b is likewise open at its underside and likewise opens into the distribution chamber 84. The second suction chamber 76b is in fluid communication with the second mixing chamber 78b through a duct 77b. Similarly, the first suction chamber 76a is in fluid communication with the first mixing chamber 78a via a duct 77a. Inasmuch as the first and second mixing chambers 78a and 78b are mutually separate, the possibility of air being sucked into the second mixing chamber 78b through the air inlet 72 is entirely precluded. In other words, in the second mixing chamber 78b no frothed milk can be generated. Nor can the milk be blown back into ducts which are not being used at that time. It is also possible to control the temperature of the dispensed milk and the frothed milk by controlling a passage diameter of the respective milk supply ducts 21, 24.

The invention is not in any way limited to the above-described embodiment, so that all obvious variants are understood to fall within the scope of the invention.

We claim:

1. An emulsifier for emulsifying steam, air and milk for preparing frothed milk for cappuccino and similar beverages, comprising a first steam inlet, an air inlet, a first milk inlet, a first suction chamber and at least one mixing chamber, while the first steam inlet, the air inlet and the first milk inlet open into the first suction chamber and at least the first suction chamber is in fluid communication with the at least one mixing chamber, characterized in that the emulsifier further comprises at least a second steam inlet, at least a second milk inlet and at least a second suction chamber, while the second steam inlet and the second milk inlet open into the second suction chamber for preparing hot, non-frothed milk under supply of steam to the second steam inlet.

2. An emulsifier according to claim 1, characterized in that the second suction chamber is in fluid communication with the mixing chamber.

3. An emulsifier according to claim 1, characterized in that the second suction chamber is in fluid communication with the mixing chamber.

4. An emulsifier according to claim 1, characterized in that the mixing chamber comprises an outlet which is in fluid communication with a first and second milk outflow channel.

5. An emulsifier according to claim 4, characterized in that the outlet of the mixing chamber opens into a distribution chamber, which comprises a first and second outlet which open into the first and second milk outflow channel, respectively, with a first and second milk outflow opening, respectively.

6. An emulsifier according to claim 5, characterized in that the first and second milk outflow openings are positioned so close to each other that milk can be dispensed from both outflow openings directly into a cup.

7. An emulsifier according to claim 1, characterized in that it includes a housing comprising the first suction chamber, the second suction chamber and the mixing chamber.

8. An emulsifier according to claim 7, characterized in that the first and second suction chambers are separate from each other.

9. An emulsifier according to claim 1, characterized in that it comprises a first and second mixing chamber, while the first suction chamber is in fluid communication with the first mixing chamber and the second suction chamber is in fluid communication with the second mixing chamber.

10. An emulsifier according to claim 9, characterized in that the air inlet comprises a controllable valve for controlling the magnitude of the air stream to the first suction chamber.

11. An emulsifier according to claim 9, characterized in that the mixing chambers each comprise an outlet which are in fluid communication with a first and second milk outflow channel.

12. An emulsifier according to claim 11, characterized in that the outlets of the mixing chambers open into a distribution chamber, while the distribution chamber comprises a first and second outlet which respectively open into the first and second milk outflow channel with a first and second milk outflow opening, respectively.

13. An emulsifier according to claim 12, characterized in that the first and second milk outflow openings are positioned so close to each other that milk can be dispensed from both outflow openings directly into a cup.

14. An emulsifier according to claim 9, characterized in that it included a housing which comprises the suction chambers and the mixing chambers.

15. An emulsifier according to claim 14, characterized in that the first and second suction chambers are separate from each other.

16. A coffee apparatus for preparing cappuccino and similar beverages, comprising a coffee unit for preparing a coffee extract and an emulsifier, the coffee apparatus having at least one steam unit for preparing steam and selection means for supplying steam to a first or second steam inlet of the emulsifier.

the coffee unit having a first and second coffee-dispensing channel with a first and second coffee outflow opening, respectively, for the simultaneous dispensing of coffee extract, wherein the first and second coffee outflow opening are positioned sufficiently close to one another that coffee can be dispensed from both coffee outflow openings directly into a cup, and further including an emulsifier wherein the first milk outflow opening and the first coffee outflow opening are positioned adjacent each other and permitting milk and coffee to be dispensed from the first milk outflow opening and the first coffee outflow opening, respectively, directly into a first cup, and the second milk outflow opening and the second coffee outflow opening being positioned adjacent each other and permitting milk and coffee to be dispensed from the second milk outflow opening and the second coffee outflow opening, respectively directly into a second cup.

17. A coffee apparatus according to claim 16, wherein the first and second milk outflow opening and the first and second coffee outflow opening are positioned so close to each other that via these openings coffee and milk can be dispensed directly into a cup.

18. A coffee apparatus according to claim 16, wherein the emulsifier is detachable connected to the rest of the coffee apparatus.

* * * * *